(12) United States Patent
Singh et al.

(10) Patent No.: US 7,738,978 B2
(45) Date of Patent: Jun. 15, 2010

(54) SYSTEM AND METHOD FOR PERFORMING PROCESS VISUALIZATION

(75) Inventors: Rajiv Singh, Natick, MA (US); James G. Owen, Bolton, MA (US)

(73) Assignee: The MathWorks, Inc., Natick, MA (US)

( * ) Notice: Subject to any disclaimer, the term of this patent is extended or adjusted under 35 U.S.C. 154(b) by 994 days.

(21) Appl. No.: 11/368,882

(22) Filed: Mar. 6, 2006

(65) Prior Publication Data

US 2006/0212145 A1  Sep. 21, 2006

Related U.S. Application Data

(63) Continuation of application No. 10/668,466, filed on Sep. 22, 2003, now Pat. No. 7,010,364.

(51) Int. Cl.
G05B 15/00 (2006.01)
G05B 11/01 (2006.01)
G05B 21/02 (2006.01)
G05B 13/02 (2006.01)
G06F 19/00 (2006.01)

(52) U.S. Cl. .............................. 700/83; 700/17; 700/51; 700/73; 700/108; 700/179

(58) Field of Classification Search ................... 700/17, 700/51, 73, 83, 108, 179
See application file for complete search history.

(56) References Cited

U.S. PATENT DOCUMENTS 5,852,673 A * 12/1998 Young ........................ 382/164
6,243,615 B1 * 6/2001 Neway et al. ............... 700/108
6,370,437 B1 * 4/2002 Carter et al. ................. 700/52
6,445,969 B1 * 9/2002 Kenney et al. .............. 700/108
7,248,938 B2 * 7/2007 Scalfani et al. .............. 700/115
7,283,664 B2 * 10/2007 Magee et al. ............... 382/165
7,286,897 B2 * 10/2007 Liu et al. .................... 700/180

* cited by examiner

*Primary Examiner*—Ramesh B Patel
*Assistant Examiner*—Thomas H Stevens
(74) *Attorney, Agent, or Firm*—Lahive & Cockfield, LLP; Kevin J. Canning

(57) ABSTRACT

A method for forecasting batch end conditions through their depiction as a multi-dimensional regions of uncertainty is disclosed. A visualization of the current condition of a continuous process and visualization of the simulated effect of user control moves are generated for a user. Volume visualization tools for viewing and querying intersecting solids in 3-dimensional space are utilized to perform the process visualization. Interactive tools for slicing multi-dimensional (>3) regions and drawing superimposed projections in 3-D space are provided. Additionally, graphical manipulation of the views of process conditions is accomplished by changing the hypothetical future values of contributing variables online in order to provide users the ability to simulate the effect of proposed control actions. The illustrative embodiment of the present invention may also be utilized in combination with a graphical programming environment supporting the execution and simulation of block diagrams and correspondingly generated process data. The scores representing the process condition may depend on estimated physical quantities as well as representations of process variability.

1 Claim, 16 Drawing Sheets

X coordinate

Y coordinate

Z coordinate

Upper control limit
 Lower control limit

SYSTEM AND METHOD FOR PERFORMING PROCESS VISUALIZATION

RELATED APPLICATION

This patent application is a continuation application of, and claims the benefit of, U.S. patent application Ser. No. 10/668,466 filed on Sep. 22, 2003, entitled "A System and Method for Performing Process Visualization".

FIELD OF THE INVENTION

The illustrative embodiment of the present invention relates generally to process visualization and more particularly to performing three dimensional graphical visualization of multi-dimensional batch process data including analysis and visualization prior to process completion.

BACKGROUND

Process engineers overseeing manufacturing processes analyze collected data related to the manufacturing process to detect faults and monitor conditions associated with the process. The analysis may be performed dynamically in conjunction with an ongoing process, or it may performed "off line" in an effort to improve the process for the next performance. Technological advances in the form of more sophisticated statistical analysis programs, faster computers and advanced process databases have contributed to increased efforts in this area by process engineers.

There has also been considerable and growing interest among researchers and practitioners in the application of process monitoring to batch processes. Batch processes typically display a non-steady state during processing. Economically the growth in interest in process monitoring this has been driven by the value of early detection and diagnosis of batch process disturbances (since many batch processes often involve high value products which in many cases have to be discarded if the batch does not follow an 'in control' trajectory). One source of the growing interest has been the lack of on-line critical product quality measurements for many batch processes. The inability to produce product quality on line measurements has sharpened the need for technology which can use existing indirect measurements of product quality to provide warning of deviant process conditions during the execution of the batch, while there is still time to take a mid-course correction.

The most widespread and established application of process visualization technology has been in its most basic form, where process operators view electronic versions of Statistical Process Control (or SPC) charts for a selection of measured process variables. Anomalous or upset process conditions are detected by recognizing when the time series shown on those charts deviate from some defined control region. The simplicity of the SPC approach has contributed to its popularity, but there are two major practical drawbacks that have limited its effectiveness:

In most manufacturing processes the measured variables are related to each other through physical interaction, so that there is not necessarily a direct relationship between a particular variable exiting its control limits and the root cause of a process upset. Additionally, most manufacturing operations have hundreds or more measured variables, making it impossible for a human operator to monitor each and every measurement using a separate SPC chart.

These limitations regarding SPC charts have prompted the development of other approaches to process condition monitoring based on Principle Component Analysis (PCA) and Partial Least Squares (PLS) as well as other multivariate statistical methods. These alternative techniques essentially detect the existence of a process upset by monitoring certain common factors (subsequently referred to herein as 'scores'), chosen to represent significant components of the overall process variability. An upset condition is flagged when the vector of scores exits some defined control region subsequently labeled the 'in-control' and 'control' region. There are established mathematical methods for detecting the incidence of this type of 'out of control' event, but visualization of the behavior of the scores relative to the 'in control' region can offer physical insight into the process behavior and the cause of an upset, especially in cases where the scores are imbued with some physical meaning. Conventionally, two approaches are used to perform visualization of the behavior of scores relative to control regions whenever 3 or more scores are involved:

Each scalar score component is viewed separately from the other scores but relative to the limits of the 'in control' region as they apply that component. The resulting monitoring display consists of n SPC strip charts (where n is the number of score components). Conceptually this is the equivalent of plotting a one dimensional cross-section of an n-dimensional score space viewed relative to upper and lower bounds defined by a one dimensional cross-section of the n-dimensional solid that defines the 'in control' region. In cases where the process condition is represented by 3 scores, a graphical projection method is often used to provide a 2 dimensional depiction of the scores and the 3 dimensional solid representing the control region (usually an ellipsoid). Those skilled in the art will recognize that 2 or fewer scores can be monitored with a two dimensional planar plot of the score trajectories and 'in-control' region without requiring any of the visualization features described in this disclosure.

One drawback of the first approach (where each coordinate is viewed separately) is that it ignores the real dependence of the 'in-control' boundaries on a combination of the coordinates, making it difficult to assess the in-control state of the process without considering all the score values simultaneously. A consequence of ignoring the effect of combining coordinates is that separate strip plots of each score can disguise the severity of an impending process upset. FIG. 1A shows a graphical projection 1 of a sequence of three scores representing the state of a monitored process where the coordinates have already been combined. The evolution of the score trajectory is represented by a line 2 and the coordinates of the most recent 3 scores are indicated by a dot 4 (it should be understood throughout the discussion herein that many of the described visualization techniques are performed using colors on an electronic display to increase visual contrast). The translucent semi-ellipsoid represents the bottom half of the 'in control' region enclosing score values defined by normal operation. It is apparent from the graphical projection 1 that the trend is towards an imminent exit of the score plot control region, and impending detection of a process upset. However, the corresponding strip chart plots 8, 10 and 12 of the individual scores and their individual control regions are shown in FIG. 1B (each individual control region is defined by the values of that coordinate within the ellipsoidal control region shown in FIG. 1b.) The individual strip charts 8, 10 and 12 give no indication of the impending upset since each score trajectory is well within the interior of each 'in control' band.

It should be noted that the concept of scores as defined in PCA/PLS process monitoring (as the coefficients describing the state of the process in the subspace of principle components) can be extended to any application where the process condition is summarized by a numerical vector. Other examples, which are based on physical rather than statistical process models, might include applications where the process condition is represented by estimates of physical quantities such as stored heat, new inflow, heat flux, etc.

In cases where the scores may be associated with physical quantities relating to process operation, the relative position of the score trajectory and the 'in-control' region provides an indication of what corrective action is needed to bring the process back into control. While strip chart plots such as those shown in FIG. 1B indicate the relative adjustments of each score required to move the process back into the 'in-control' region, the geometrical intuition provided by graphical projections usually provides faster human perception of the relative adjustments of the three score values. The graphical projection approach has therefore increasingly been used to try to give a more geometrical view of the scores and the 'in control' region. In general however even this is not sufficient to completely convey either the process state or its trend.

Although more informative than the strip charts, a static graphical projection suffers from a number of drawbacks. Conventional graphical projections cannot unambiguously convey the position of the scores in a 3-dimensional space since the computer screen is essentially a 2-dimensional depiction and each point on a graphical projection defines a line in 3 dimensions. The user must also be able to move the viewpoint of the display in order to create a sequence of graphical projections so as to clarify the ambiguity of multiple positions in 3 dimensional space corresponding to a single point depiction on a 2 dimensional graphical projection. The ability to shift viewpoint in order to view processed data is missing in conventional methods. Additionally, the representation of the control region fails to allow viewing of both the interior and exterior of the 'in control' region in order to display whether and where score trajectories enter or exit. Another significant shortcoming of conventional process visualization methods is that there are generally more than three scores, in which case a 3 dimensional graphical projection will not be capable of representing the 4 or more score coordinates. Conventional process visualization techniques lack the ability to combine graphical methods with exploration methods in order to allow the user to vary the geometry of the projection and so gain insight into the relationship between the scores and the 'in control' region.

An additional problem with conventional graphical visualization methods arises when there is a need to visualize regions of scores represented as 3 dimensional or higher bodies (or geometrical shapes) as opposed to the type of score trajectories shown in FIG. 1A and FIG. 1B. The need to visualize three dimensional or higher bodies with a three dimensional control region arises in batch multi-way process monitoring where the scores are not known precisely during the batch and consequently score vectors are characterized as regions of uncertainty rather than single points. Also, 'what if' or scenario analysis analyses where measured variables are allowed to take values over some set of possibilities, and the potential interaction of the score loci with the 'in control' boundary must be viewed to asses the affect of each of the possibilities also requires the need to visualize the interaction of three dimensional or larger solids in space. In these situations inference depends on assessing the overlap of 3 dimensional or larger solids in space. Without the ability to vary the viewpoint parallax makes the process of determining the relative positions of the solids difficult and one dimensional cross sections often yield misleading results.

Unlike continuous processes, batch processes are usually designed to have varying conditions over the course of their run, and consequently any assessment of the batch condition must take into account the entire course history rather than just the current conditions. The standard approach to batch process monitoring is to use extensions of multivariate statistical methods for continuous processes (known as multi-way PCA and multi-way PLS) adapted to handle non-steady state conditions. Multi-way methods work by considering each new observation of each measured variable during the batch as a distinct variable, and the entire batch as a single observation of that collection of variables. Thus, the history of all the measured variables during the batch is reduced to a single vector representing one extended observation, and the overall batch state of the batch by the vector of scores calculated for that observation. Viewing observations of the same measurement at different times as distinct variables allows multi-way methods to treat different times differently, in effect recognizing that different periods of the batch trajectory are more or less impact on final product quality. However, computation of the score vector requires the complete batch history, which presents a challenge for in-course assessment of the state of the batch, because the observation set required for estimation of scores is not complete while the batch is running. Consequently, forecasts of future measurements are employed (extending from the current time until the end of the batch) to complete the multi-way observation vector and calculate estimates of the likely end of batch score vector. Since the future measurement trajectories are uncertain, the calculated end point scores are no longer defined by a vector but rather by a probability distribution.

When these probability distributions are viewed geometrically they define a region of probable values in score space rather than a single point. Assessment of whether the final score vector will likely end up in the control region then amounts to judging whether there is significant overlap between the region of end point uncertainty and the region defining the score values of 'in-control' batches. While probability distributions of score vectors for in-process batches have been derived by various methods in the research literature, there has been no development of techniques for their visualization other than for one score component at a time. Thus the potential for misleading and confusing results stemming from one-dimensional visualization that was discussed above is further heightened for the case of batch process monitoring attempting the more complex task of assessing the relative position of two regions (score uncertainty region which is evolving in time as more of the measurement trajectories become available and the 'in-control' region).

SUMMARY OF THE INVENTION

The illustrative embodiment of the present invention provides a method for forecasting batch end conditions through their depiction as a multi-dimensional regions of uncertainty. A visualization of the current condition of a continuous process and visualization of the simulated effect of user control moves are generated for a user. Volume visualization tools for viewing and querying intersecting solids in 3-dimensional space are utilized to perform the process visualization. Interactive tools for slicing multi-dimensional (>3) regions and drawing superimposed projections in 3-D space are provided. Additionally, graphical manipulation of the views of process conditions is accomplished by changing the hypothetical future values of contributing variables online in order to provide users the ability to simulate the effect of proposed control actions. The illustrative embodiment of the present invention may also be utilized in combination with a graphical programming environment supporting the execution and simulation of block diagrams and correspondingly generated process data. The scores representing the process condition may depend on estimated physical quantities as well as representations of process variability.

In one embodiment, in a computing environment with a display for viewing by a user, a method collects batch process data from an ongoing process. The batch process data comprises measurements of the ongoing process. Analysis is performed on the collection of data while the process is ongoing. An indicator of process condition is determined based on the analysis. The indicator of process condition is based in part on predicted future data from the ongoing process and estimates of uncertainty of those forecasts, The indicator of process condition and the control region are displayed in a graphical projection depicting a three dimensional view to the user monitoring the process.

In another embodiment, in a computing environment having a user interfaced with a display monitoring the process, a method provides batch process data that is measurements of the process. Analysis is performed on the collection of data. An indicator of process condition is determined based on the analysis. The indicator of process condition is a region containing likely batch end point score locations for the measured data in the process. The indicator of process condition and a control region of acceptable variability are displayed in graphical projection depicting a three dimensional view to the user monitoring the process. The user is able to manipulate a plurality of three dimensional parameters associated with the display via a control. In an embodiment, in a computing environment having a display for viewing by a user, a method collects batch process data from an ongoing process. The batch process data includes n dimensions of scores, the scores being common factors chosen by a user to monitor significant components of overall process condition. An indicator of process condition is determined based on analysis of the n dimensions of scores. The indicator of process condition is based in part on predicted future data from the ongoing process. Three dimensions of scores are selected from the n dimensions of scores. The indicator of process condition is displayed as a region for the selected three dimensions of scores based on a value in the n−3 non-chosen dimensions of scores. A visual indicator representing an end point for the n−3 dimensions of data within the control region is displayed in a two dimensional view. The visual indicator is cross-referenced to the three dimensional display and the indicator of process condition. The method then adjusts the display of the visual indicator of process condition in response to user movements of the two dimensional visual indicator.

In a different embodiment, in a computing environment a system includes a collection of process data from an ongoing process. The system also includes means for analyzing the collected data. The analysis determines an indicator of process condition based in part on predicted future data from the ongoing process. The system also includes a display displaying the indicator of process condition and a control region of acceptable variability in three dimensions to a user monitoring said process.

In an embodiment, in a computing environment with a display for viewing by a user, a method collects process data from a continuous process. Analysis is performed on the collection of data. An indicator of process condition is determined based on the state of the continuous process. The indicator of process condition and a control region are displayed in a graphical projection depicting a three dimensional view to the user monitoring the process.

DETAILED DESCRIPTION

The illustrative embodiment of the present invention enables interactive visualization of ongoing batch processes. Multiple dimensions of collected process data may be visualized in a three dimensional environment to determine whether a continuation of the ongoing process is likely to continue until the end within acceptable operational parameters. The process visualization methods of the present invention scale to handle more than three dimensions of data. Process engineers monitoring a process are able to alter variables in the displayed visualization in an attempt to determine acceptable changes to the ongoing process.

Figure 1A:
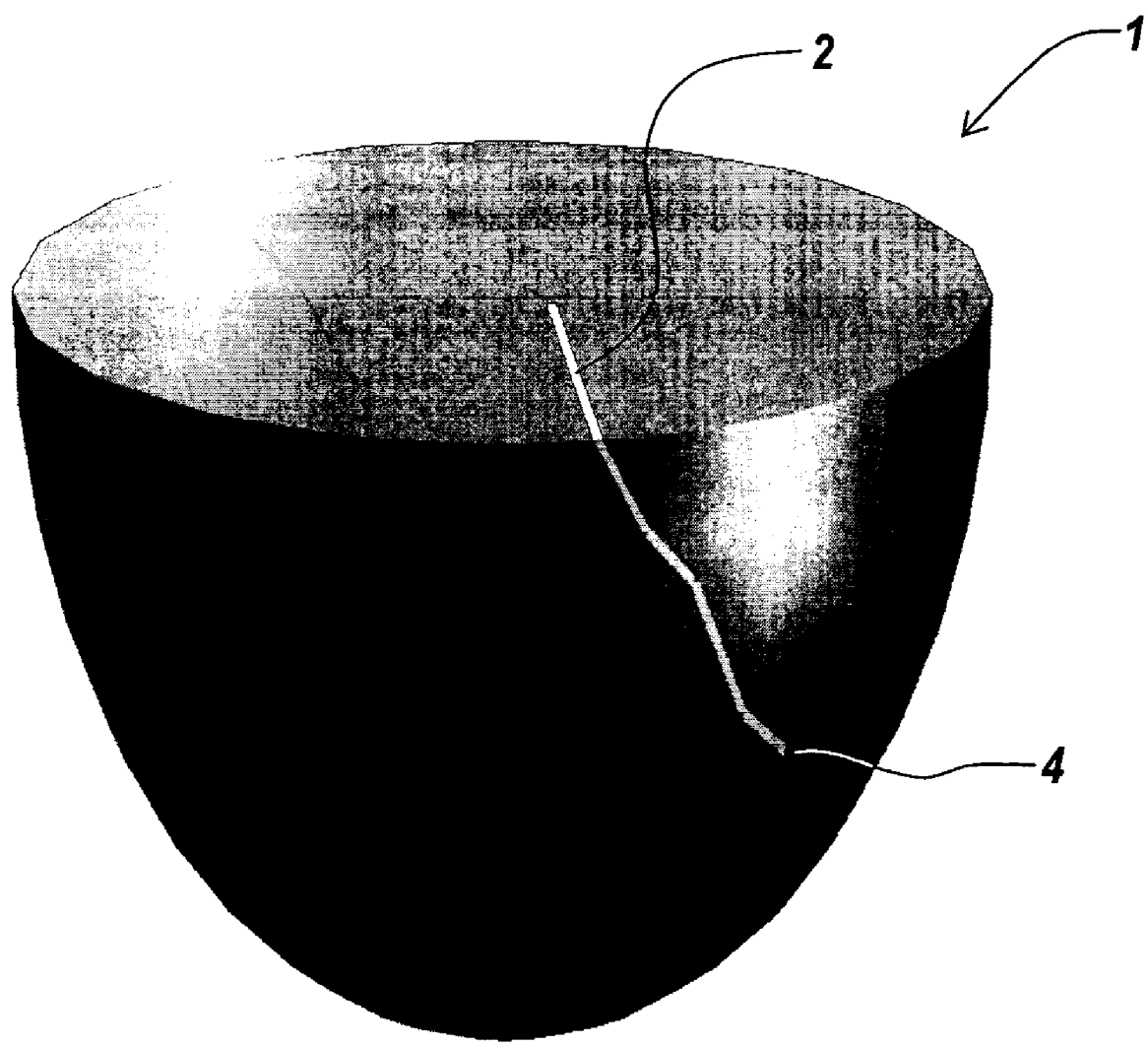
FIG. 1A(prior art) depicts a prior art graphical projection method.
Figure 1B:
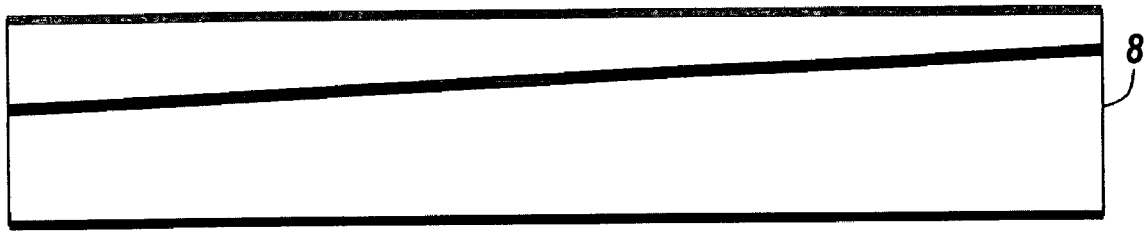
FIG. 1B(prior art) depicts a prior art Statistical Process Control Charts.
Figure 1B:
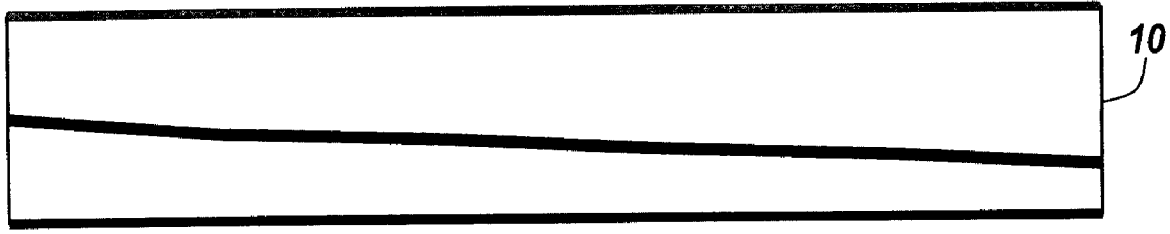
Figure 1B:
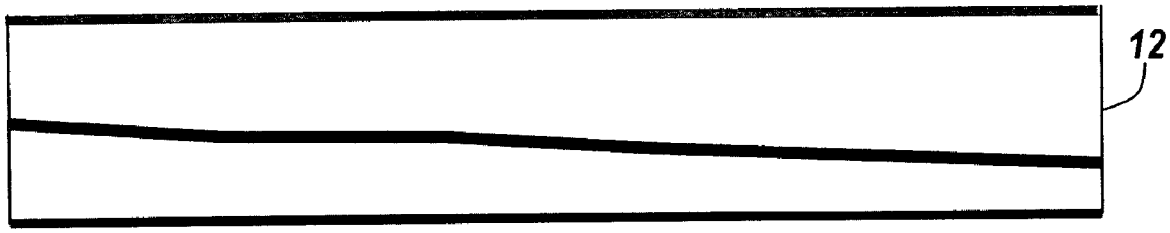
Figure 1B:
Figure 1B:
Figure 2:
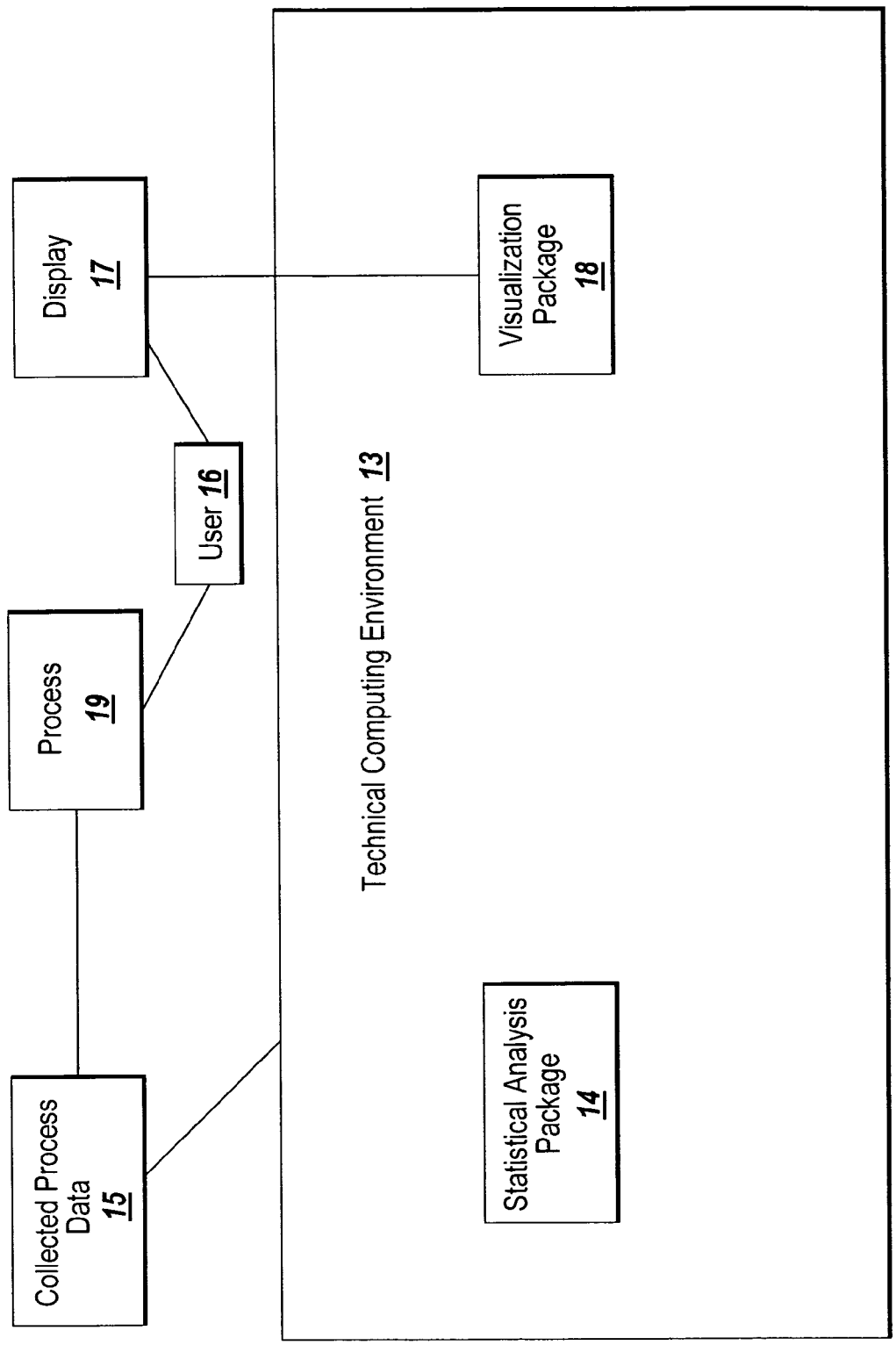
FIG. 2 is a block diagram of an environment suitable for practicing the illustrative embodiment of the present invention.

FIG. 2 depicts an environment suitable for practicing the illustrative embodiment of the present invention. A computing environment 13 such as a MATLAB™ and/or SIMULINK™ (from The MathWorks, Inc. of Natick, Mass.) based environment includes or has access to a statistical analysis package 14. The computing environment is also interfaced with a source of collected process data 15. The statistical analysis package 15 is used to analyze the collected process data by PCA, PLS or similar methods. The source of collected process data 15 is collecting, or has collected, data from a process 19 that may be ongoing and may be a continuous process. The process may be a manufacturing process such as the production of petrochemicals or semiconductors, or it may be another process that generates data such as the execution or simulation of a block diagram. A user 16, who may be a process engineer, may monitor the process 19 while the process is ongoing. The user 16 is also interfaced with a display 17 which is connected to the computing environment 13. A visualization package 18 in the computing environment is used to display analyzed process data in three dimensional and two dimensional views on the display 17 for the user's review.

For the purpose of explaining the establishment of the control region used by the illustrative embodiment of the present invention, reference will be made herein to a sample batch monitoring of a semiconductor metal etching process. Data supporting the examples is available from Eigenvector Research via its web site. This publicly available data set, from Eigenvector Research, consists of the measurements of engineering variables from a LAM 9600 Metal Etcher over the course of etching 129 wafers. The data consists of 108 normal wafers taken during 3 experiments and 21 wafers with intentionally induced faults taken during the same experiments. For each wafer, about 100 measurements were taken for 21 variables during the process run.

Multi-way PCA procedures may be used to represent the state of each batch as a PCA score vector. Datasets from normal (calibration) batch runs are used in order to extract the lowest possible order principal component space that explains most of the process variability for a normal operation. The principal component model that explains most of the process variability is then used to define a nominal region of acceptable variability in the principal component space for the calibration batches. The test dataset is mapped to the reduced order principal component space in order to represent the entire history of the dataset as a single point in the score space.

Figure 3:
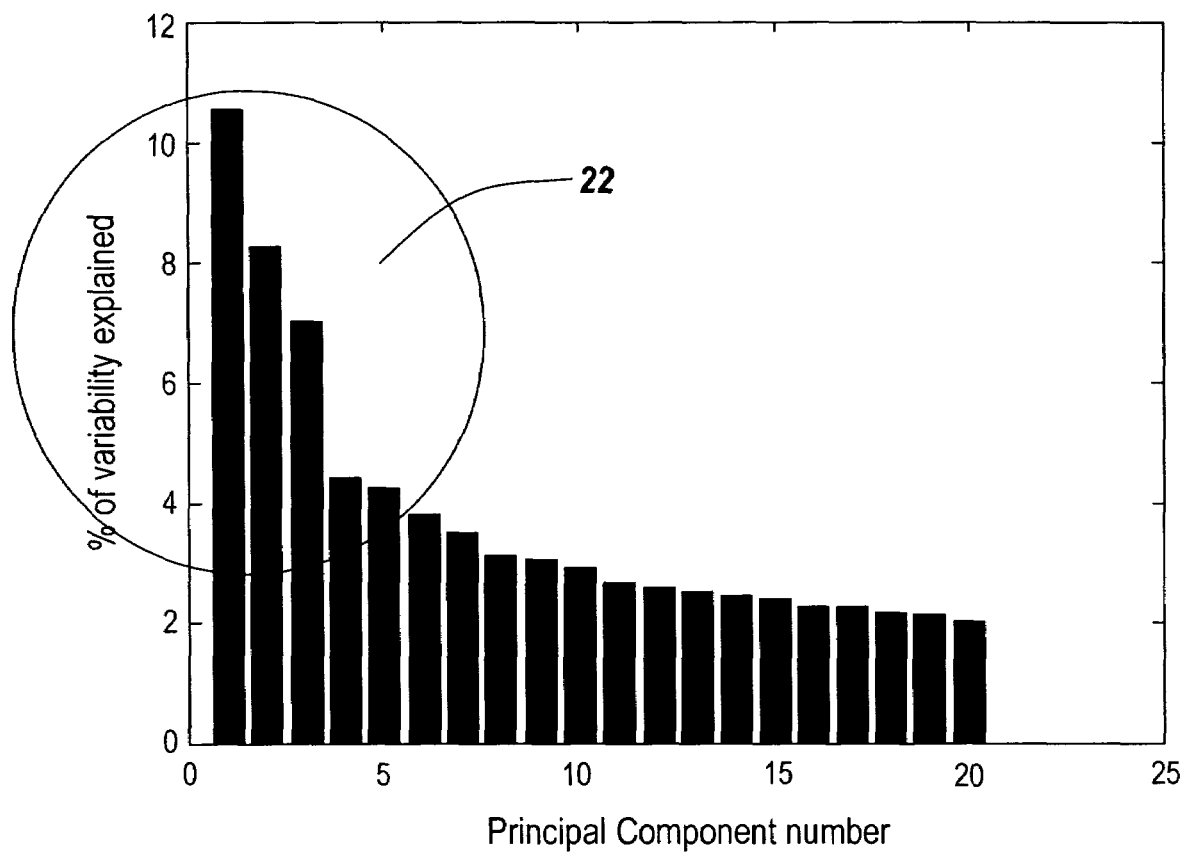
FIG. 3 depicts a five component model selected from the first 20 components.

As an example, for derivation of a PCA model, 107 normal batches were run. Twelve out of twenty-one variables were chosen for analysis. The measurements of these variables were interpolated to produce a uniform sampling interval and the entire measurement set of a batch was unfolded into a single data vector. The result was 107 vectors of nominal data (one for each batch), each containing about 1100 samples. Using PCA modeling technique, a five component model for the calibration data was extracted. As shown in FIG. 3 which shows the total variability for the first twenty components, the five component model 22 explains most of the process variability (for normal runs) and a three component model could also have been chosen.

Using the five component model 16, it is possible to map the data vector of each normal (calibration) batch into the (5 dimensional) score space as a single point. The ellipsoid defined by the 95% variance of these points from the 107 normal batches is taken as the region of nominal (acceptable) variance. This region will be referred to as in-control region.

Figure 4:
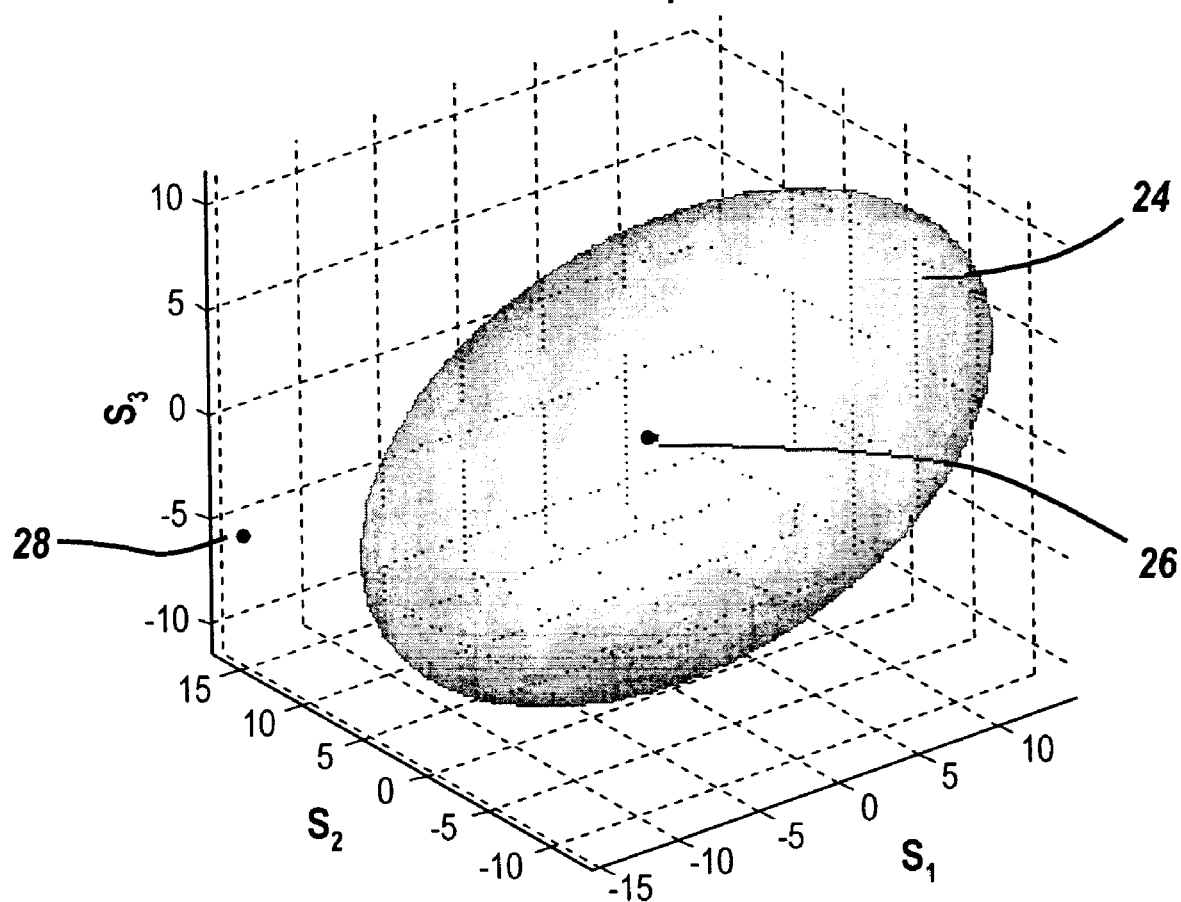
FIG. 4 depicts the mapping process for completed batches.

Once the in-control region has been defined, the unfolded data vectors for the test batches may be mapped onto the score space as single points and their location evaluated relative to the in-control region. FIG. 4 depicts the mapping process for completed batches. A control region 24 includes a mapped point 26 for a test batch inside the in-control region (dot in the figure). The location indicates with 95% confidence that the test batch was probably normal (good). The test point 28 that lies outside the in-control region 24 indicates that there is a strong likelihood that this particular test batch ran differently from a normal batch (dot outside control region). This may be an indication of a fault or failure to a process operator.

Figure 5:
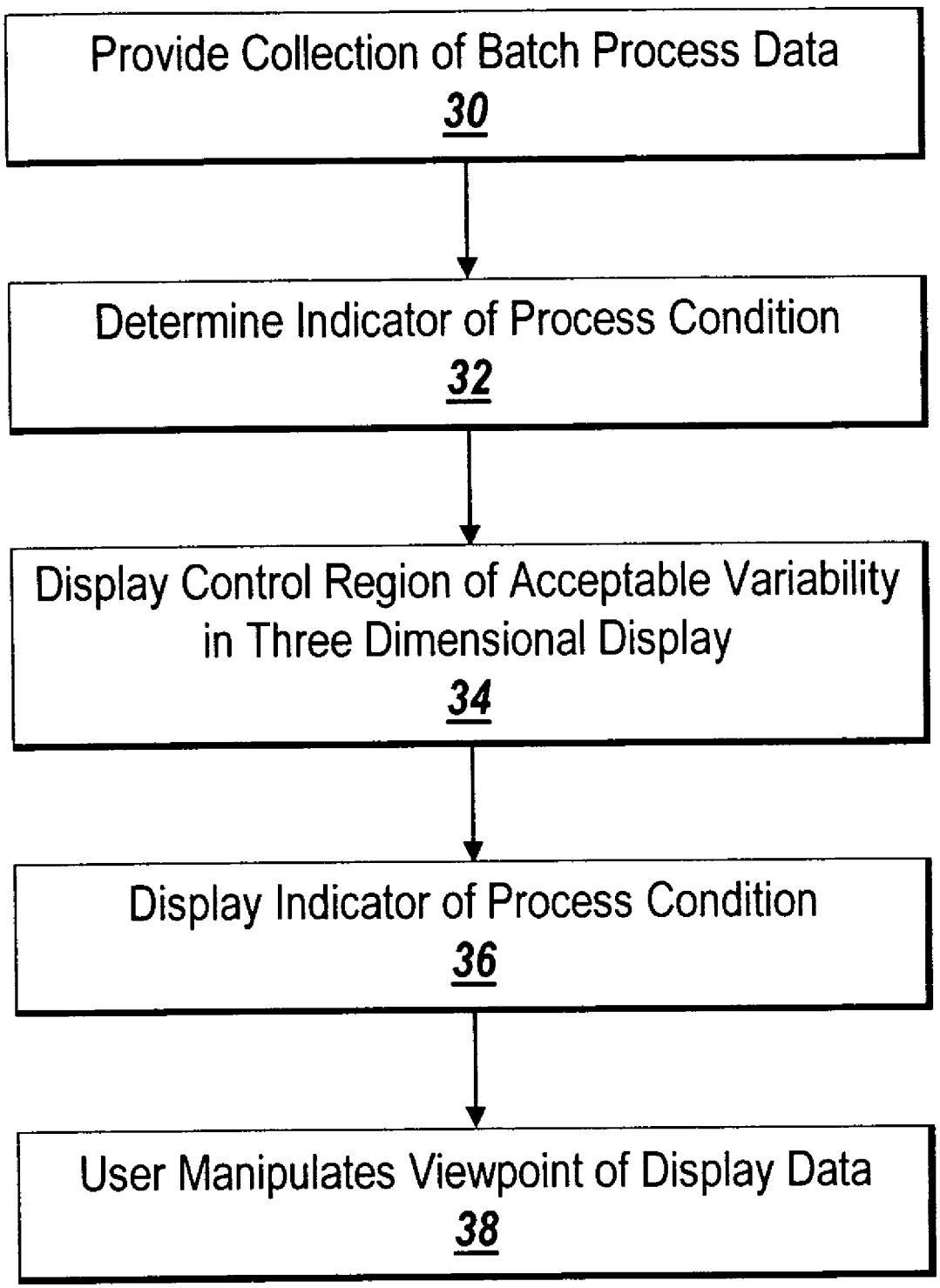
FIG. 5 is a flowchart of the sequence of steps followed by the illustrative embodiment of the present invention to display process condition for completed batch processes.

FIG. 5 depicts a flowchart of the sequence of steps followed by the illustrative embodiment of the present invention to display process condition for completed batch processes. The sequence begins by providing a collection of batch process data (step 30). An indicator of process condition is then determined quantifying the end point of the dataset as a vector of scores(step 32). A control region enclosing the acceptable variability in in-control batch scores is displayed (the control region having been determined in the manner discussed herein) in a three dimensional view (step 34). The indicator of process condition is then displayed on the same display as the control region (step 36). The user may then manipulate the display (as discussed herein) in order to determine the location of the indicator of process condition in reference to the three dimensional solid representing the displayed control region (step 38).

The above example provides a useful means of analyzing quality of batch processes whose recorded measurements are stored in large (historical) datasets. In this manner, a completed batch can be evaluated against various quality and performance yardsticks. The illustrated embodiment of the present invention may also be utilized to visualize data from as-yet non-completed (or running) batch process by predicting the end conditions of the data in advance while a batch is still running.

Multi-way PCA/PLS treats each process measurement at each time as a distinct variable, and accordingly, the values of variables defined by measurements extending from the current time until batch completion are unknown. Therefore, the illustrative embodiment of the present invention formulates an approach where a priori distribution for the variability of the unmeasured variables is assumed, and the running batch's score space end-condition is forecasted based on a partially complete record of measurements extending from the beginning of the batch to the current time. The geometry of the region representing this distribution may be defined in terms of the covariance of the observed and as yet unobserved measurements and the weightings that define each score in terms of each of the measurements (PCA loadings) as expressed in equation (1), which is discussed below. The PCA loadings are computed using historical data from the set of calibration batches. If the process measurements are assumed to have a Gaussian probability distribution, then this region will be ellipsoidal. Suppose v is a vector of random variables representing each of the process measurement at each time during the batch, organized in chronological order. Suppose further that the current batch is only $\frac{1}{3}^{rd}$ complete and the intention is to characterize the distribution of score end points based on the partial measurement trajectories available up to the current time. It is possible to split the sequence of variables into those which have been observed and those yet to be observed, $$v = \begin{bmatrix} v_{measured} \\ v_{unknown} \end{bmatrix},$$

where $v_{unknown}$ represents the unobserved (latter $\frac{2}{3}^{rd}$) component of the data vector. If $\Sigma$ represents the overall covariance of v evaluated from the calibration data, and W is the matrix of loadings for each score, then the variable defining the score vector S for the running batch can be expressed as:

$$S = Wv = \begin{bmatrix} W_1 & W_2 \end{bmatrix} \begin{bmatrix} v_{measured} \\ v_{unknown} \end{bmatrix},$$

where $W_1$ and $W_2$ are components of W decomposed based on the lengths of $v_{measured}$ and $v_{unknown}$. S is thus a vector with unknown components ($W_2 v_{unknown}$ being the unknown part). If we assume a Gaussian distribution for the variance of $v_{unknown}$, then the mean and covariance of S can be expressed as:

$$\mu(S) = (W_1 + W_2\Sigma_{21}\Sigma_{11}^{-1})v_{measured}, \quad (1)$$
$$\text{cov}(S) = W_2(\Sigma_{22} - \Sigma_{21}\Sigma_{11}^{-1}\Sigma_{12})W_2^T.$$

Here, $\mu(.)$ represents the conditional mean and cov(.) represents the conditional covariance of the current batch's score vector based on the measurements to date. $\Sigma_{11}$, $\Sigma_{21}$ etc are sub-matrices extracted from $\Sigma$, depending upon the relative lengths of $v_{measured}$ and $v_{unknown}$. Geometrically, the regions representing sets of scores (that represent likely end points up to some confidence level) will be ellipsoidal if the distribution of process measurements is Gaussian. The center of the ellipsoid is the expected value of the score vector $\mu(S)$, while the size is proportional to the square-root of the eigenvalues of the covariance matrix cov(S). Thus, larger the uncertainty in data (larger covariance), the larger is the size of the corresponding forecast region (ellipsoid). Depending upon the nature of a particular process, different assumptions can be made about the variance of the unmeasured variables. This method of representing uncertainty in forecasts of a running batch's end-conditions as multi-dimensional solids is lacking in conventional visualization methods for process data.

Figure 6:
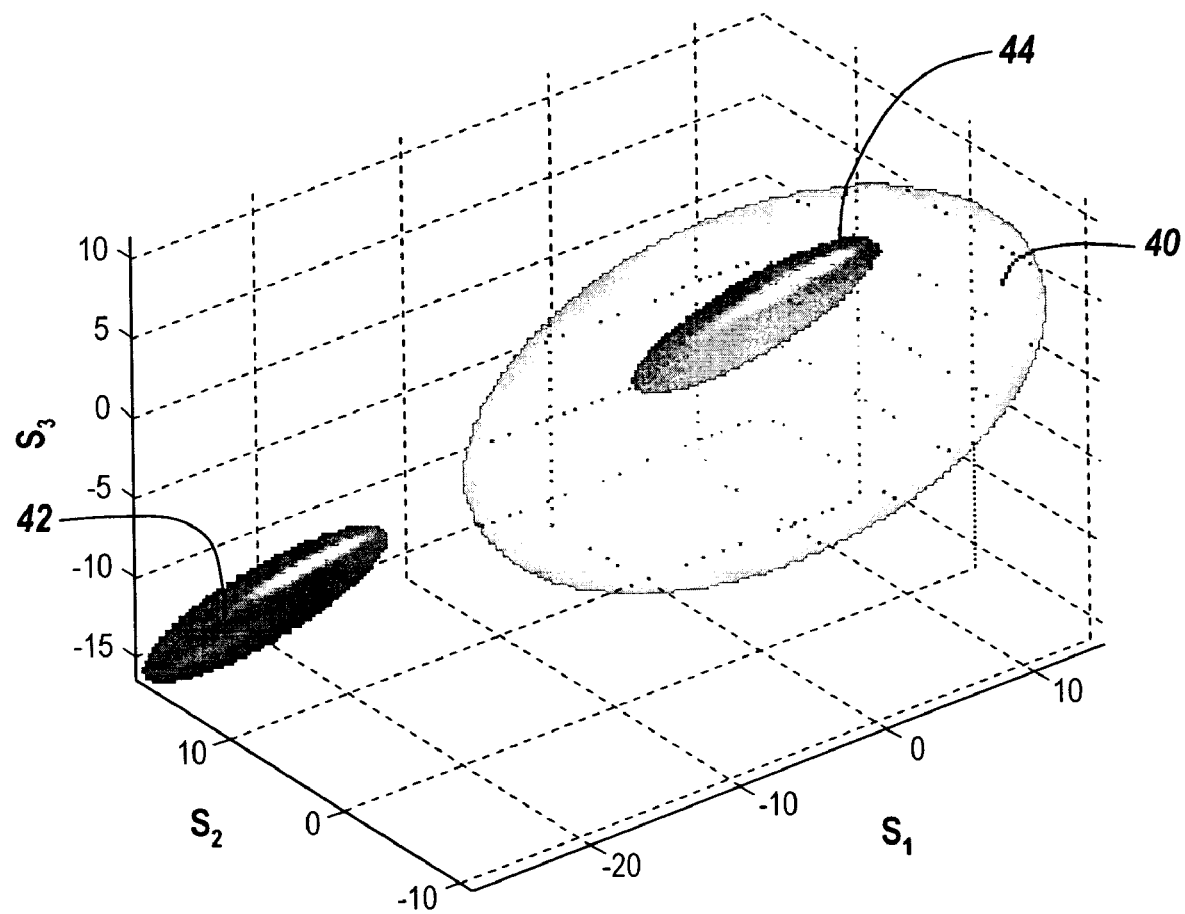
FIG. 6 depicts the display differences between forecasts for normal and faulty test batches.
Figure 7C:
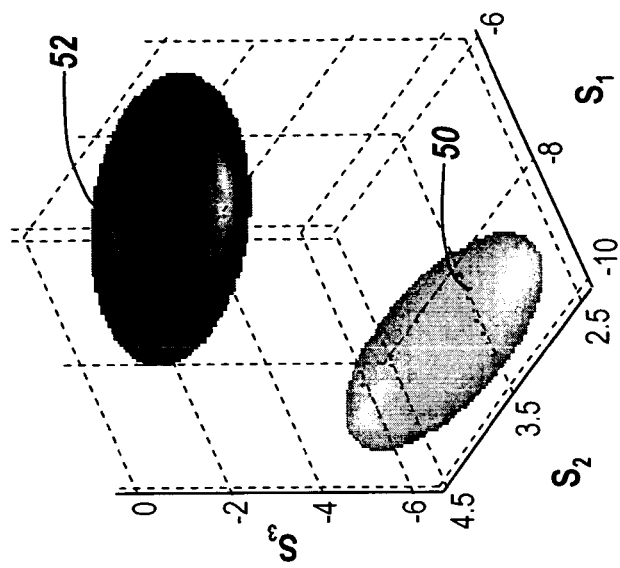
FIG. 7C depicts an fault forecast made by the illustrative embodiment of the present invention.
Figure 7B:
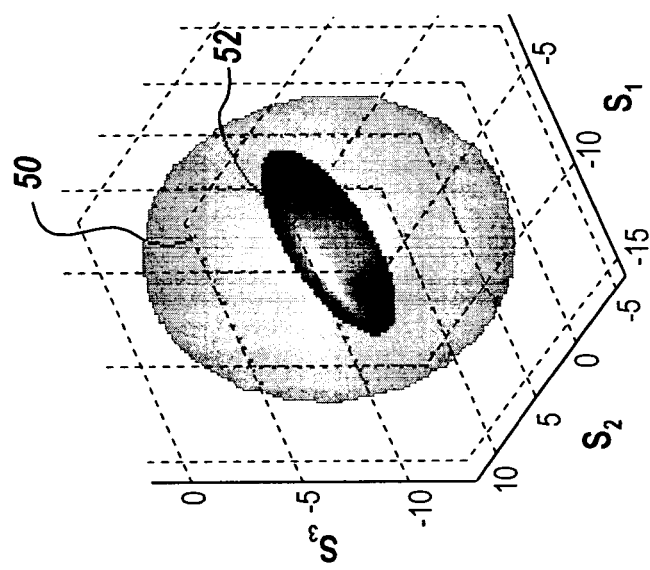
FIG. 7B depicts an satisfactory forecast made by the illustrative embodiment of the present invention.
Figure 7A:
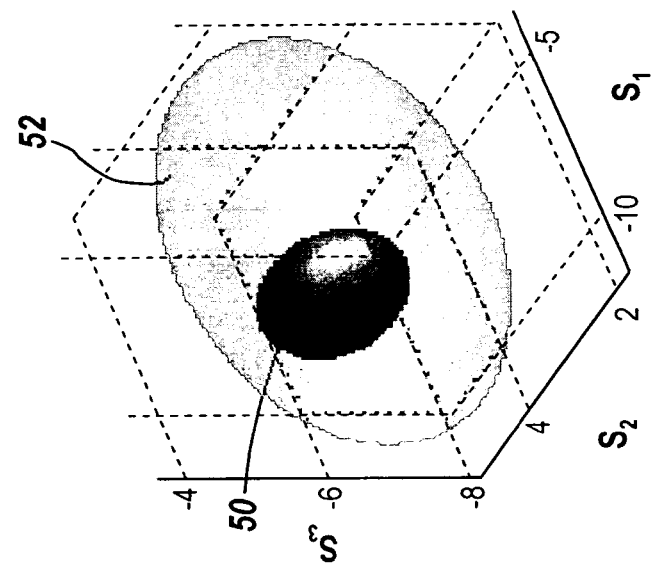
FIG. 7A depicts an uncertain forecast made by the illustrative embodiment of the present invention.

For the current example, the forecasted regions for a normal and a faulty test batch ($\frac{1}{3}^{rd}$ complete) appear as shown by a first 40 and second 44 ellipsoids in FIG. 6. A control region 40 is also displayed. The intersection of the in-control region 40 with the forecasted end-point region provides a measure of the likelihood that the running batch will end up in the in-control region. In the following three cases, a definitive decision can be made about the process behavior. If the predicted score region 52 is large and encloses the in-control region 50 as shown in FIG. 7A, a decision cannot be made because of the high level of uncertainty in the location of the batch scores. The plant operator must wait until more measurements become available. If the in-control region 50 completely encloses the forecasted score region, 52 as shown in FIG. 7B, then there is a strong probability that the batch will have similar results to the calibration batches and the operator does nothing. However, if the two regions 50 and 52 are disjointed as shown in FIG. 7C, then the batch may be off course and may require adjustments.

Figure 8:
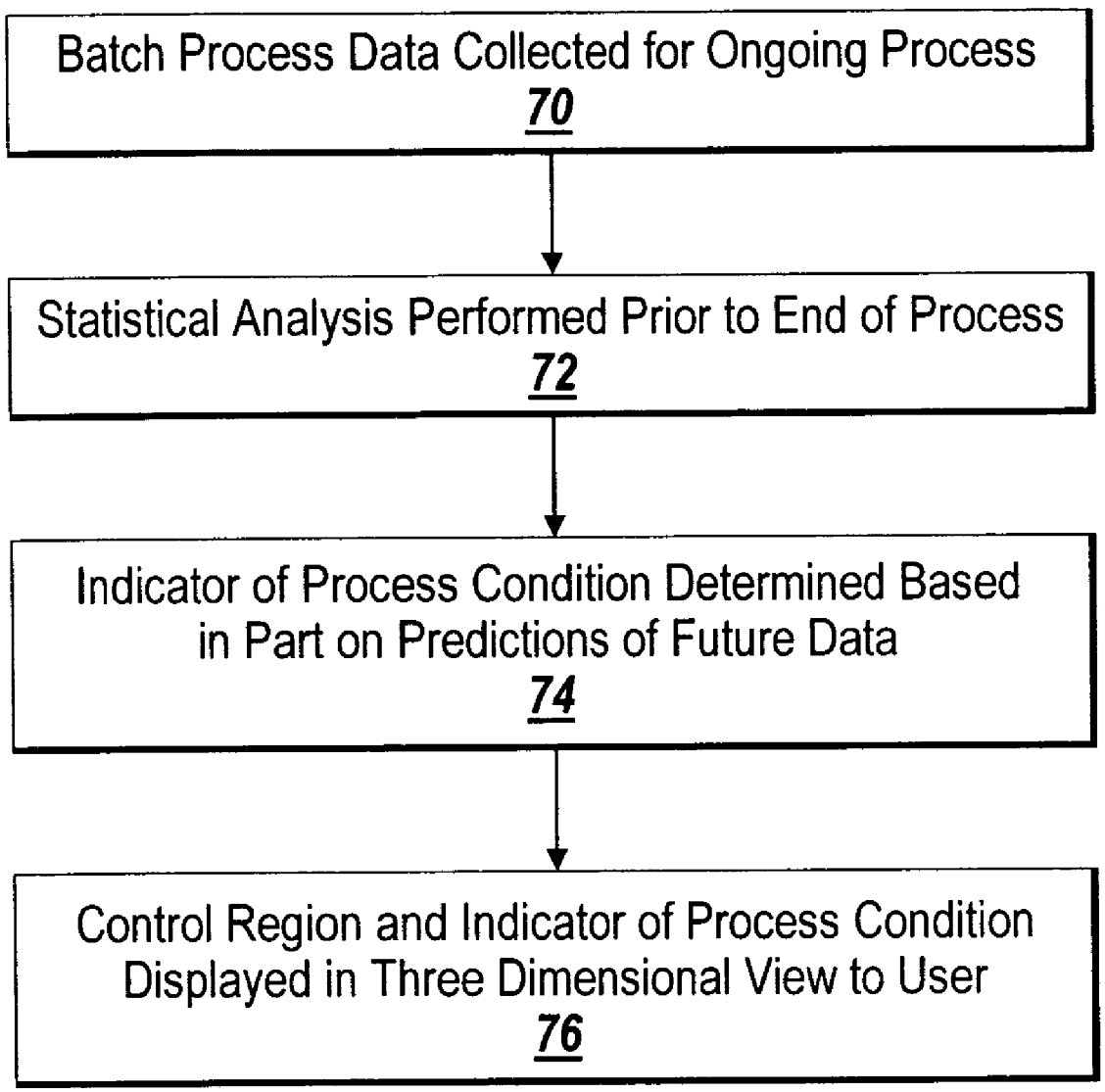
FIG. 8 is a flowchart of the sequence of steps followed by the illustrative embodiment of the present invention to display process condition for ongoing batch processes.

The sequence of steps followed by the illustrative embodiment of the present invention to display three dimensional visualizations of process data from ongoing processes is set forth in FIG. 8. The sequence begins with batch process data being collected from an ongoing process (step 70). Statistical analysis is performed on the process data prior to the end of the process (step 72). An indicator of process condition is determined based in part on forecasted future process data values (step 74). The indicator of process condition suggests probable end point data values. A determined control region and an indicator of process condition are then displayed in a three dimensional view in for a user (step 76). The superposition of the two solids on the display indicates whether the ongoing process needs to be altered or not.

In addition to characterizing the amount of disjointedness, volume visualization as used in the illustrative embodiment of the present invention may provide an indication of the direction in score-space of any deviation of the set of likely score end points from the control region. If the scores have physical meaning then this orientation information can provide an indication of the cause of the evolving aberrant behavior and decision support for taking mid-course corrective action.

A number of visualization techniques are used to make these inferences from the visualizations of score end point sets and the 'in control' region. The color and transparency (opacity) of solids may be varied in order to view their relative locations or embedment clearly. The viewpoint of the displayed values may be rotated to view the surface from any direction, to ascertain the extent and the direction of intersections between the forecasted end-point region and the in-control region. The lighting conditions may be varied, the brightness altered, and the motion of camera light and viewpoint may be animated to assist in analysis of intersecting or superposing surfaces.

Further insight into the progress of a batch can be gained by viewing the evolution of the forecasted end-point regions. The uncertainty in forecasting, and consequently the sizes of the forecasted regions, will reduce as the batch progresses and more measurements become available. Thus, at the end of the batch the size of the forecast region diminishes to a single point representing a unique score vector. For an abnormal batch the forecast regions could diverge away from the in-control region as more measurements become available. The ability to assess a potential trend towards a process upset by viewing the progression of the regions of uncertainty is made possible by effective use of color, lighting and transparency control of intersecting/superposing solids. As each new measurement becomes available, a new (smaller) ellipsoid is superposed, and may be distinguished from the existing ellipsoids by using a higher opacity (less transparency), and a darker color. For example, a "HSV" (hue-saturation-value) coloring scheme available in MATLAB may be chosen in which the colors vary from a light orange to a deep red. The in-control region is shown by a wire-mesh, which enables easy view of its intersection of forecasted end-point regions.

Figure 9:
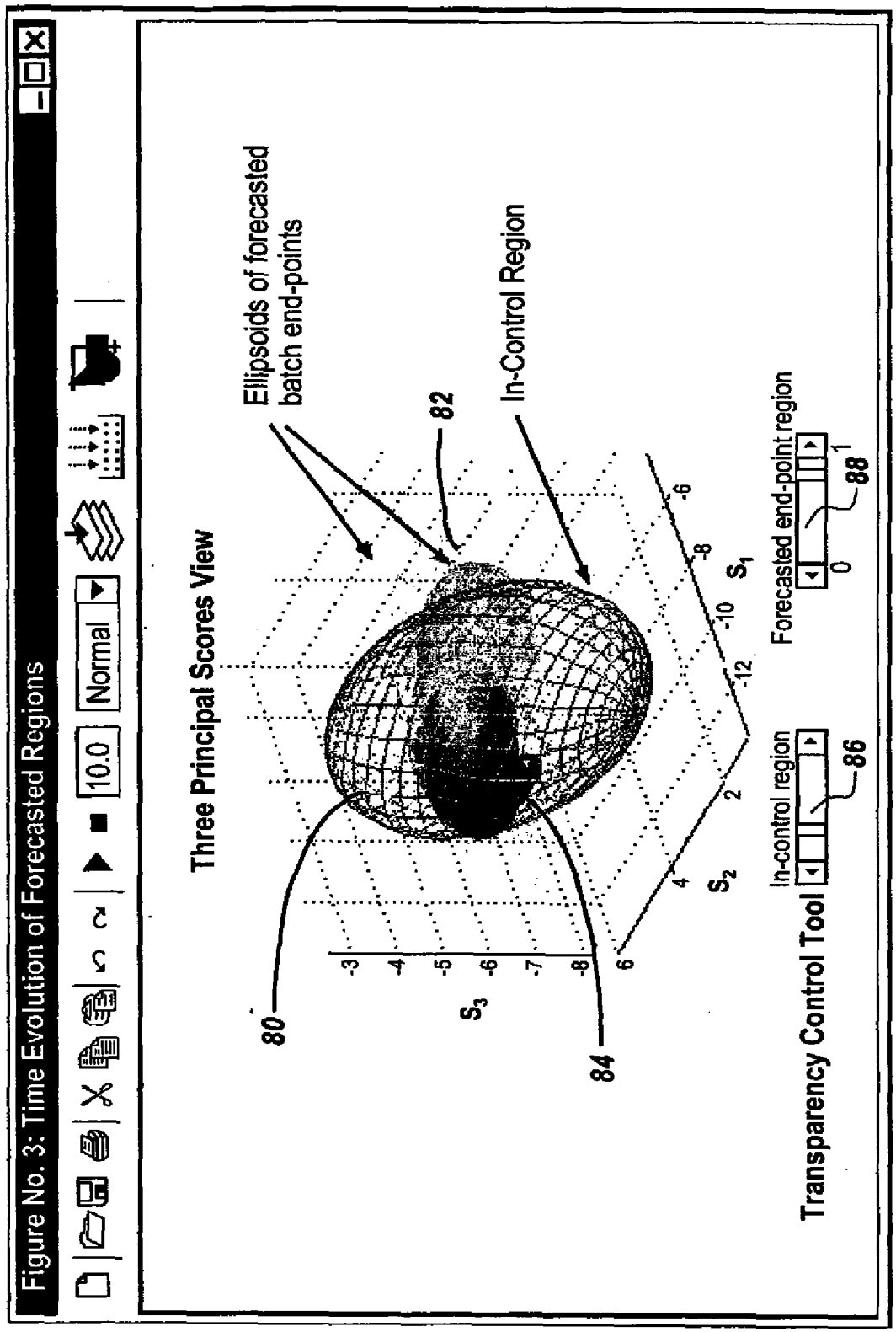
FIG. 9 depicts visual controls provided by the illustrative embodiment of the present invention.

FIG. 9 depicts the visual controls provided by the illustrative embodiment of the present invention. A control region 80 is bounded with a wire mesh effect. Different shaded regions 82, 84 of displayed data intersecting the control region with the later measurements appearing smaller and darker. Also available are user interface controls for the display allowing the user to adjust the transparency of the control region 86 and a slider 88 to adjust the forecasted end point region.

The visualization tools of the illustrative embodiment of the present invention allow the visualization to be extended to more than to 3-dimensional spaces. Indeed, the score spaces usually have more than 3 dimensions, (although this number is usually not large in practice). Graphical methods that allow querying greater-than-three dimensional score spaces by interactive projections from score regions in greater than 3 dimensions onto 3-dimensional volumes extend the visualization benefits to processes described by arbitrary numbers of scores.

Figure 10:
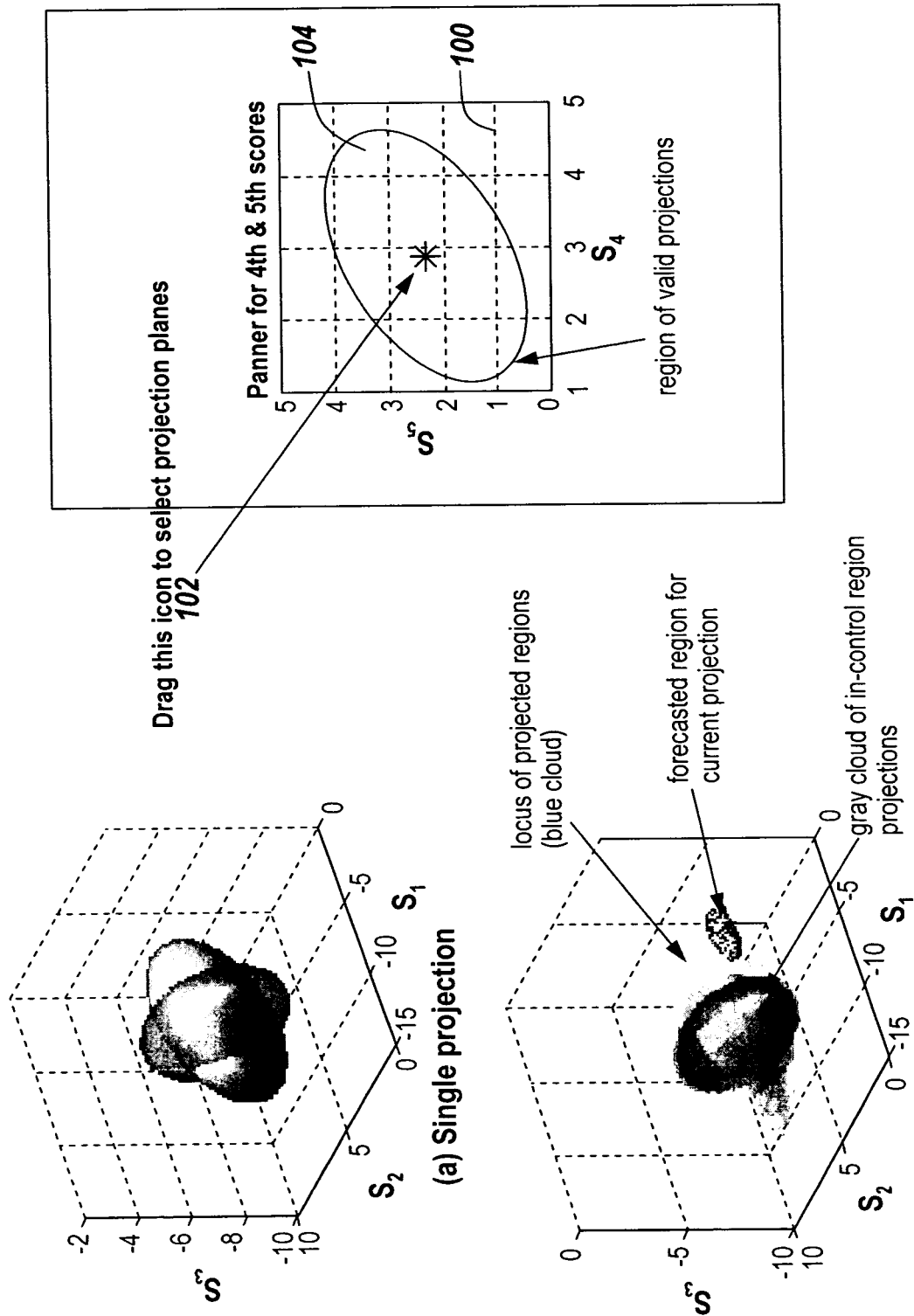
FIG. 10 depicts a data panner utilized by the illustrative embodiment of the present invention.

The illustrative embodiment of the present invention creates "data panners" (described below) that allow the user to visualize greater than three dimensional solids by projecting them onto 3 dimensions and interactively varying the geometry of the projection. The present invention also allows superimposing the 3 dimensional projections obtained to view a sequence of 3 dimensional cross-sections of the higher dimensional forecasted end-point region. Interactive data panning along higher dimensions may be made possible by MATLAB handle graphics tools. An example of such a data panner is shown in FIG. 10.

The data panner 100 provides a two dimensional view of the $4^{th}$ and $5^{th}$ dimension of score data. Slicing projections are performed along 4th and 5th dimensions to obtain the locus of projection in a 3-D plane. An icon 102 in the region of valid projections allows a user to select a projection plane. The data panner 100 provides an interactive way of doing so in real-time. As the icon 102 is moved by mouse, the projections update automatically. The data panner 100 is cross referenced with the three dimensional display of process data values.

If there are n scores then the region describing the score end point uncertainly will exist in an n dimensional space. The n dimensional solid may be visualized by fixing n−3 of the score coordinates at values of a point within the n dimensional solid, and then viewing the set of all possible values of the 3 remaining coordinates for points in the solid within a 3 dimensional graphical projection. The user can visualize the n dimensional solid by varying the location of the n−3 initial coordinates, and viewing the behavior of the 3 dimensional graphical projections describing admissible values of the remaining coordinates. Selection of the initial n−3 coordinates requires the user to select them with the mouse from a graphical description of the set of possible values defined by points in the n dimensional solid. This graphical tool is labeled a "data panner" herein.

The process visualization of the present invention follows certain rules in visualizing process data. If the n dimensional solid is ellipsoidal, each of the views will be a representation of a 3 dimensional ellipsoid. If n is 4 dimensions, the data panner requires the selection of a single coordinate from an interval. If n is 5 dimensions, the data panner requires the selection of a pair of coordinates from a 2 dimensional shape. This can be achieved by selecting a single point with a mouse click. In most cases the scores selected with the data panner will be the less significant scores, since in general this will result in less drastic movement of the score view as the data panner is manipulated.

In the illustrative embodiment of the present invention, a dynamic link is created between the panner that controls the projection planes along the higher (>3) dimensions and the projected 3-D views. Thus, as a user moves the mouse to choose a projection point along $4^{th}$ and $5^{th}$ dimensions, the corresponding 3-D projections of the in-control region and forecasted end-point region update automatically. In FIG. 10, the ellipse 104 (in the right-hand-side panner) marks the region defined by the $4^{th}$ and $5^{th}$ score coordinates of points in the 5 dimensional solid defining the set of score end points. The user can grab the blue star-shaped icon 102 and move it around inside the ellipse. Each location of this icon defines a pair of orthogonal surfaces along which the section in $4^{th}$ and $5^{th}$ dimensions are taken. The present invention may also be extended to non-orthogonal slicing without departing from the scope of the present invention. Arbitrary surfaces encompassing one or more dimensions may be defined along which the projection could be taken. Such slicing surfaces would be user-defined.

Figure 11:
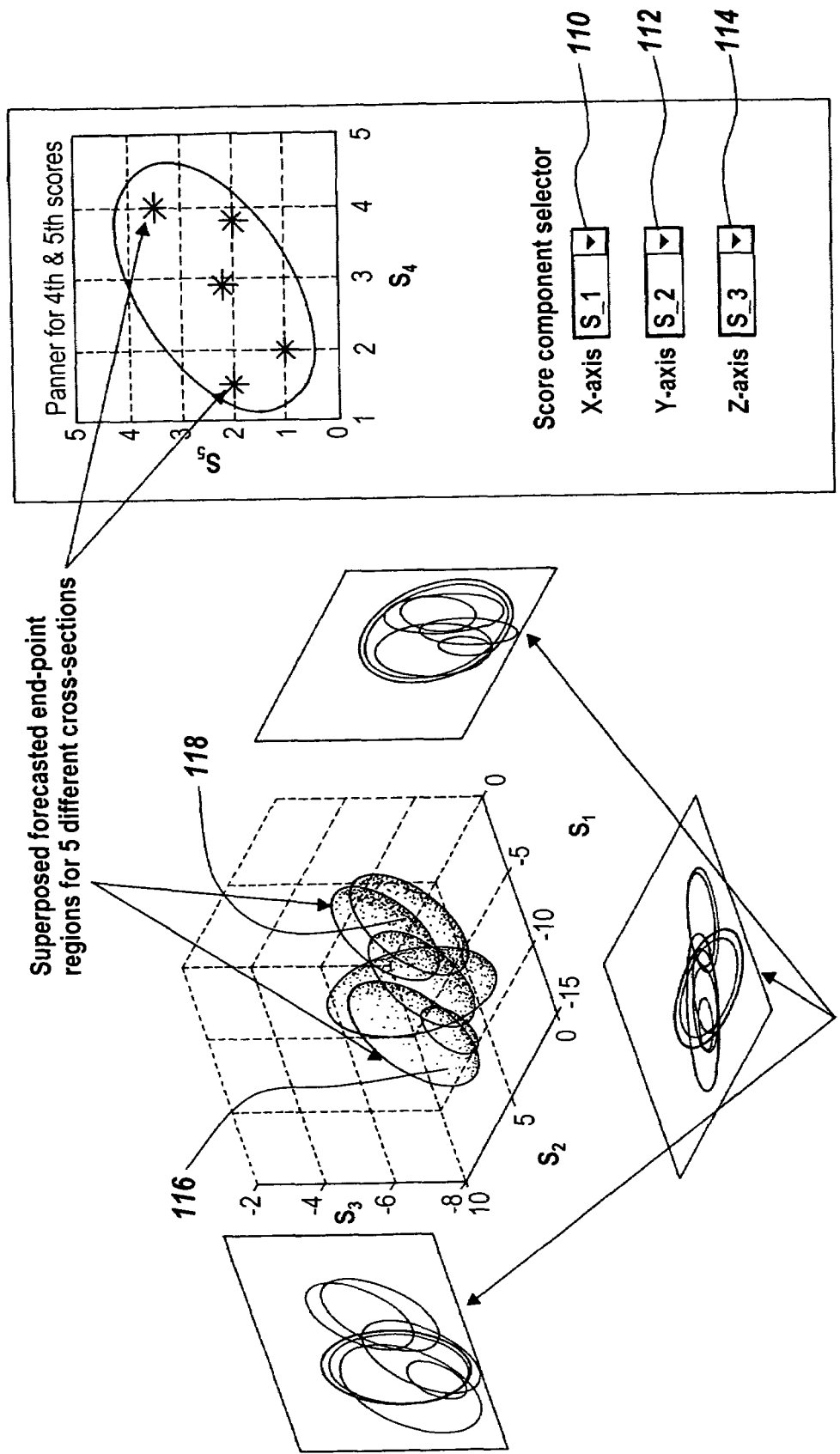
FIG. 11 depicts the interrelationship between the data panner of the present invention and the three dimensional view of the process data.

To gain a better understanding of the relative locations and the extent of intersection between the two regions, it is possible to superpose the projections from different cross sections along higher dimensions. This is achieved by using a "data panner", also referred to as a "projection selector". The primary three components are chosen for visualization of forecasted batch end points. The remaining n−3 components are used to define an n−3 dimensional region along which valid projections can be taken. A trail of the projected 3-D regions can be visualized as a function of the position of the blue-star icon. The resulting view is shown in FIG. 11. The data panner 100 also has three score selectors 110, 112 and 114 that a user manipulates to select score (explained below). The selection may be done in real time. The superposed projections of the in-control region and the forecasted end-point regions appear as different colored clouds 116 and 118. The loci-clouds represent intersecting regions in 3-D space for a given choice of three principal components.

The approach of analyzing projections of higher dimensional spaces is completed by providing the ability to choose any 3 out of n (n: dimension of score space) principal components for drawing the projections. Since there are 10 ways of choosing unique triplets out of a set of 5 objects, there is a choice of 10 different projection views in 3-D space, for a 5-dimensional PCA model. The combination of abilities to superpose projections and choose any 3 score components for projection subspace provides the user with a rich set of options to monitor and query forecasted scores over the run of the process.

Figure 12:
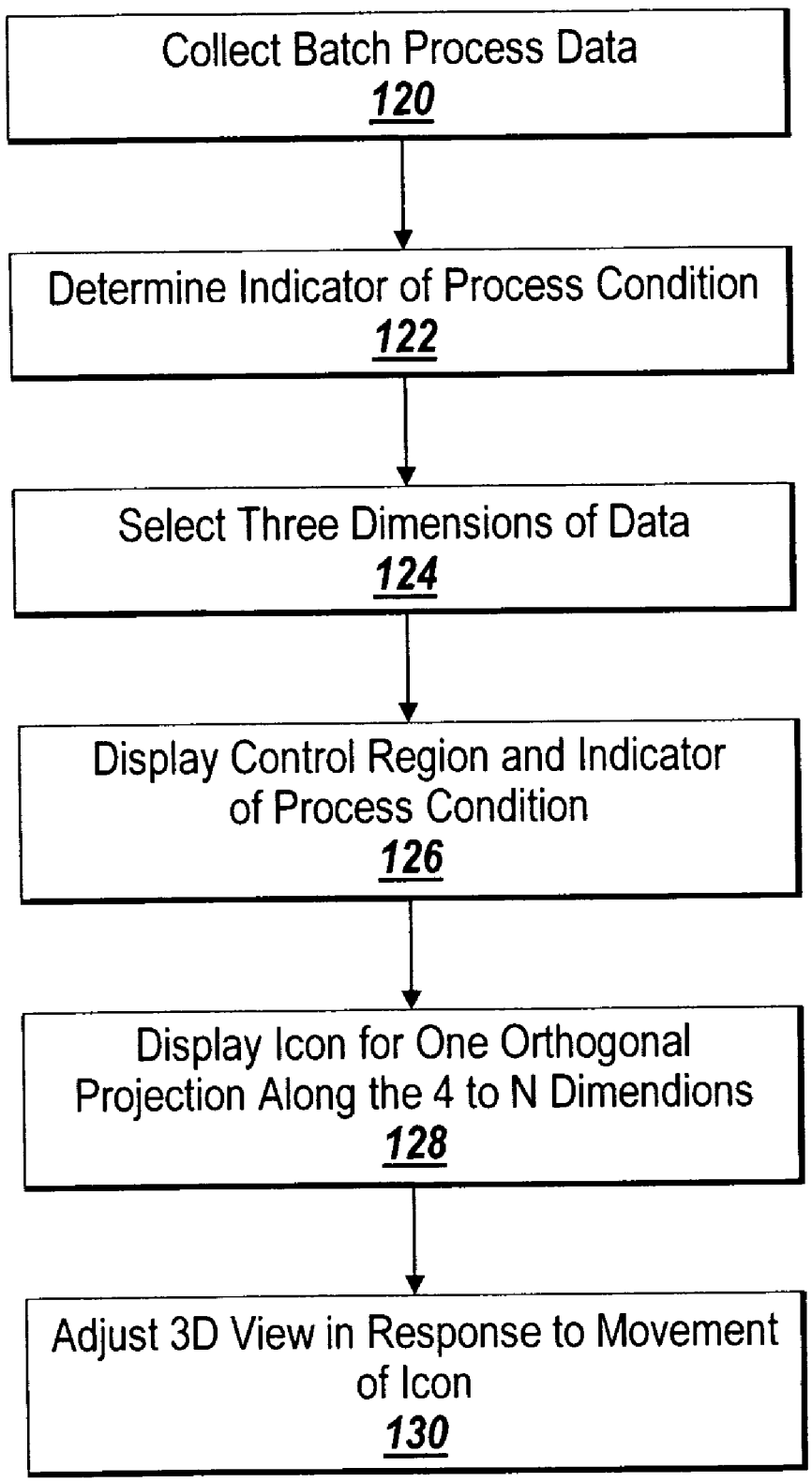
FIG. 12 is a flowchart of the sequence of steps followed by the illustrative embodiment of the present invention to visualize more than three dimensions of scores.

FIG. 12 is a flow chart of the sequence of steps followed by the illustrative embodiment of the present invention to use the data panner to visualize more than three dimensions of scores. The sequence begins with batch process data being collected from an ongoing process (step 120). An indicator of process condition is determined based upon statistical analysis of the process data (step 122). The user selects three dimensions of scores from the n dimensions of data (step 124). A control region of acceptable variability and the indicator of process condition are then displayed in three dimensions (step 126). A separate region for the remaining n−3 components is then drawn that indicates the locus of locations where valid projections can be taken. An icon is then displayed inside this projection selector region that represents the location of the current projection that is being displayed in the 3-dimensional volume view (FIG. 11A). The three dimensional view is then altered in response to user manipulation of the n−3 icon (step 130).

The graphical visualization techniques of the present invention may be used for not only detecting but also modifying/correcting an aberrant process behavior. Visualization of the dependence of end point regions on various hypothetical future values of key variables can help an operator decide which input changes may move the score region back into the 'in control' region. Aberrant behavior may be corrected by simply holding one of the input variables to a constant value for the remaining course of the process.

For example, for a running process, at a particular logging instant, a fault may be detected by observing that the in-control region and the forecasted batch end-point region do not intersect. A particular process input variable may then be held to an adjustable constant value from the current time until the end of the batch in order to observe the effect of the constant value on the forecasted region; in affect modifying the forecast for hypothetical scenario. Various constant values for the chosen process variable can be tested to evaluate which scenario maximizes the proximity between the two regions. Since multiple variables may be under the user's control this procedure may be repeated for other variables.

Figure 13:
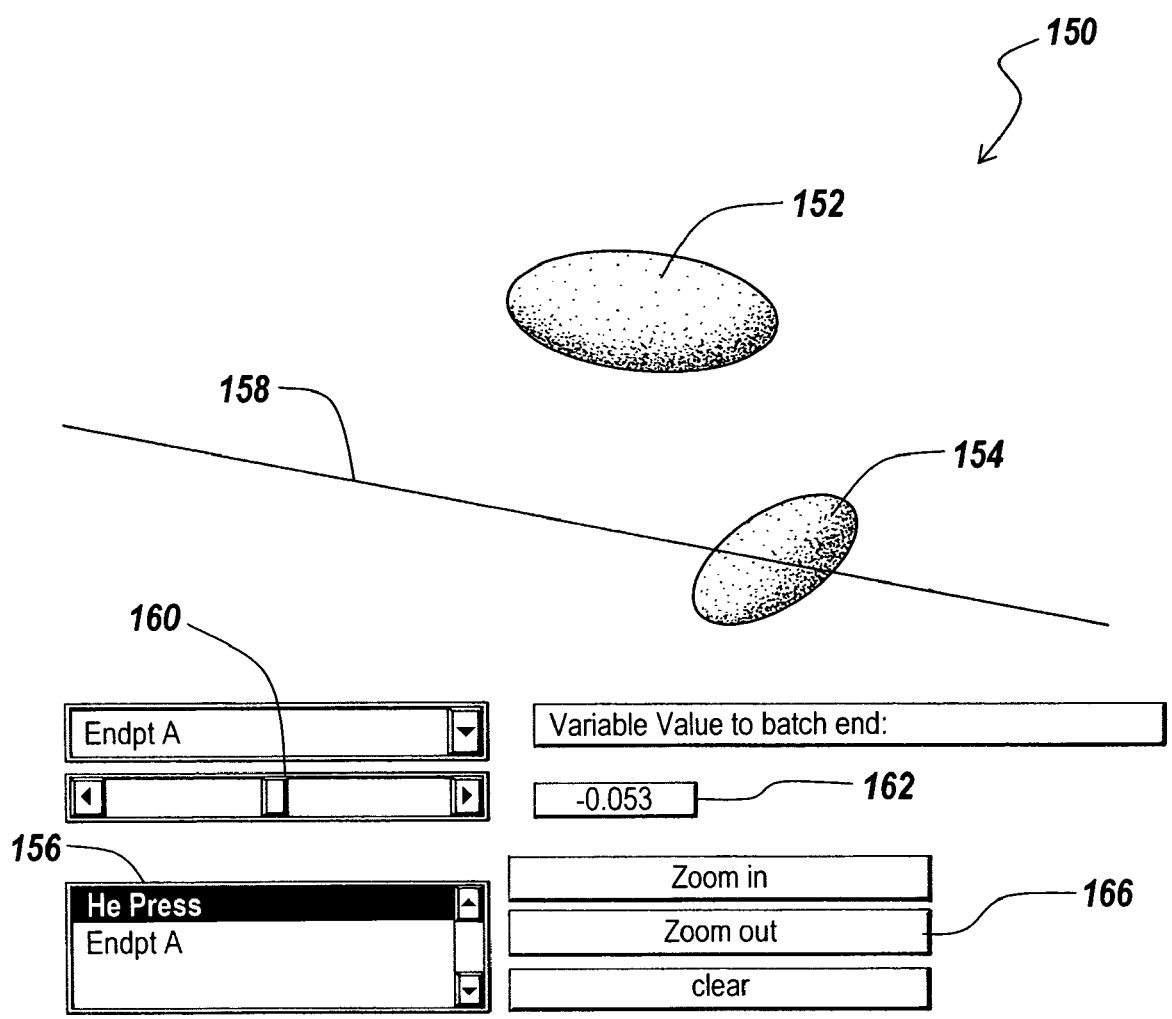
FIG. 13 depicts a current forecast for a batch end point predicted by the illustrative embodiment of the present invention.

FIG. 13 shows the current forecast 150 for a batch end point. The displayed regions 152 and 154 do not intersect, which is an indication of a fault. To correct the behavior, a user selects one variable at a time from the popup menu. The currently selected variable appears in edit box below, which is "He Press (helium pressure)" 156 in the figure. For the chosen variable, the line 158 running through the forecasted end-point region indicates the locus of the forecasted regions' location for various fixed values of that input ("He Press") from the current time until batch completion. The value of the input variable is changed using the slider 160, which is dynamically linked to the position of the forecasted end-point region. The chosen value is displayed in a text area 162 located towards the right of the slider.

Figure 14:
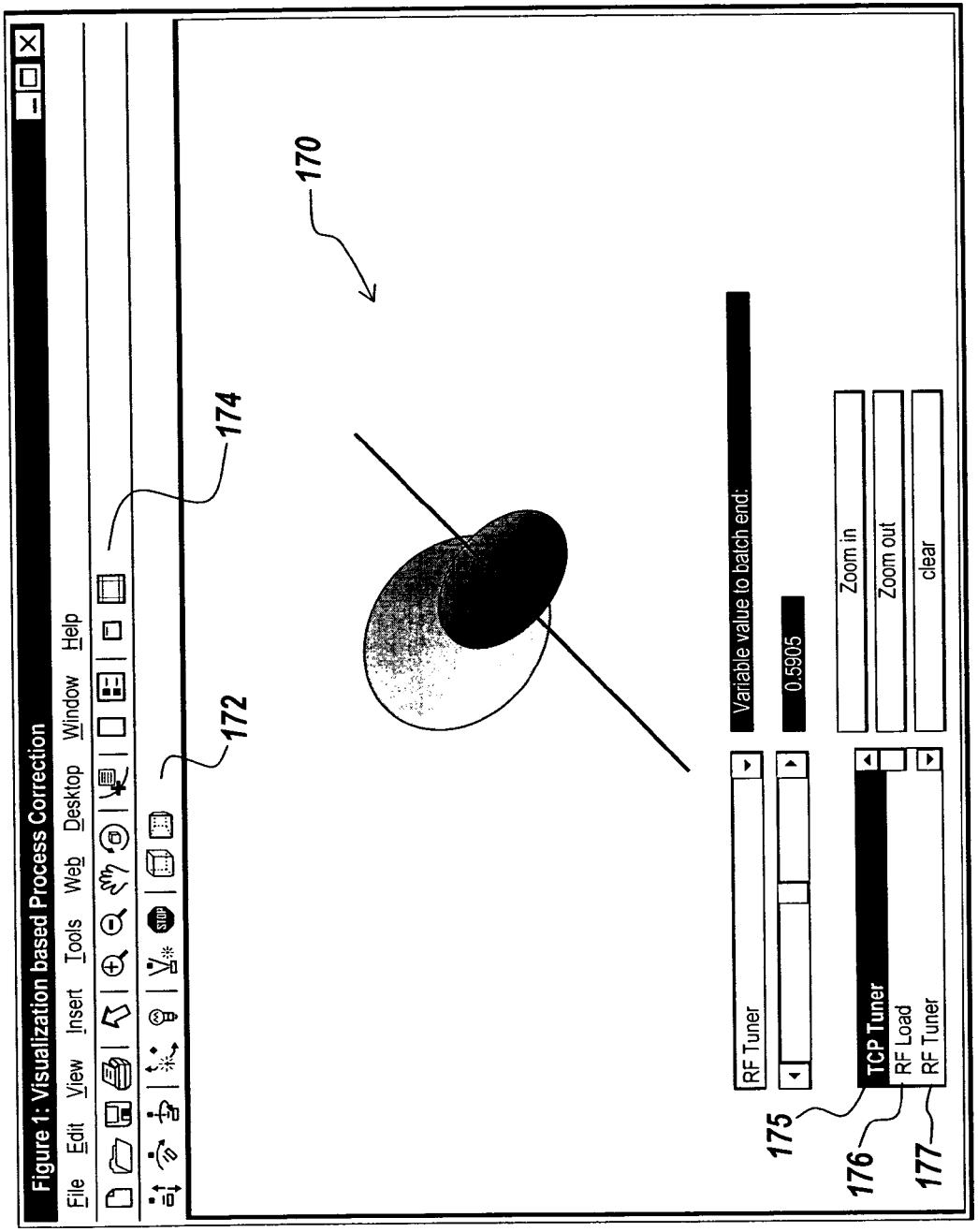
FIG. 14 depicts display controls used to manipulate a forecast end point.

FIG. 14 shows controls to rotate the whole view 170 and its lighting and color properties can be adjusted interactively using the FIG. 172 and camera 174 toolbars. The zooming option 166 provides additional control over querying the locations and intersections of these surfaces. Indeed, this type of graphical exploration maneuver is essential to judging whether the end point region locus intersects the 'in control' region. FIG. 14 depicts a process being brought to normal behavior ("in control"), by assigning fixed values for variables—TCP Tuner 175, RF Load 176, and TCP Load 177.

Figure 15:
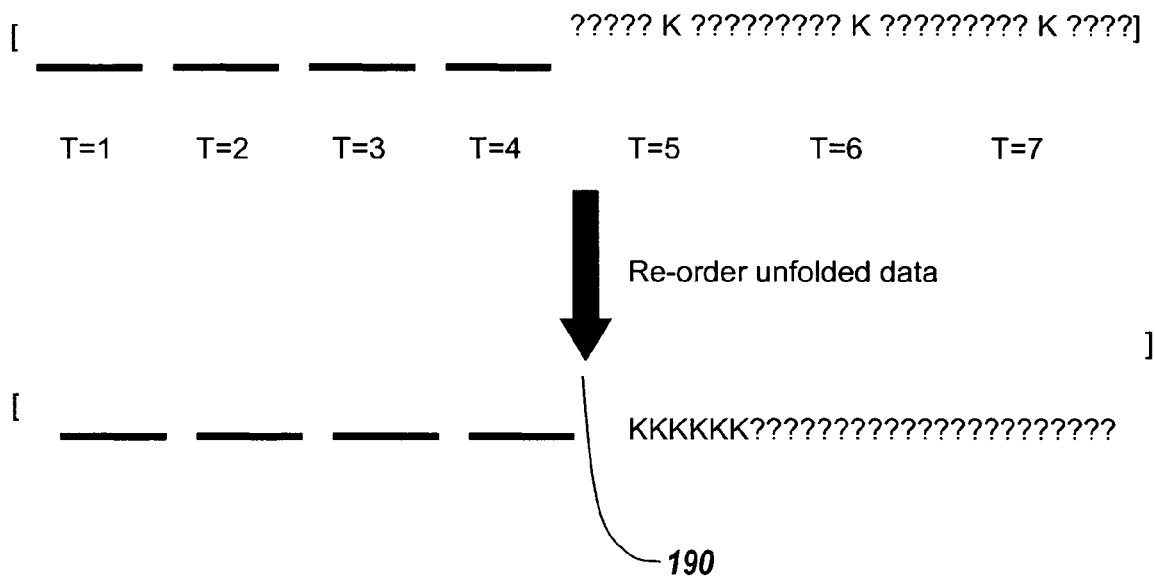
FIG. 15 depicts the unfolding of measurements into a single data vector.

FIG. 15 describes the modification to the multi-way PCA unfolding algorithm to account for a variable that is assumed to be held constant until the end of the batch: Multi-way PCA method involves unfolding of measurements of all process variables into a single data vector. Fixing a single process variable to a constant value K 190 amounts to re-organizing the data to keep the known values together with the already-measured variables. Thus, hypothetical data (of value K) is treated as if it were known into the future. Conditional means and covariance are calculated for the new data split, since the partitioning of matrices W into $W_1$, $W_2$, and $\Sigma$ into $\Sigma_{11}$, $\Sigma_{12}$, $\Sigma_{21}$, $\Sigma_{22}$ changes.

The present invention also allows the process data to be visualized by prescribing time-dependent trajectories for several process inputs together, rather than hold them to constant levels. This forces a different reshaping of the forecasted region. Similarly, limits on the variability of certain process variables might be required. These limits would also correspond to regions similar to the forecasted end-point regions in the score space. The intersection of variable-constraint region with the in-control region would help in evaluating the feasibility of achieving desired performance under prescribed constraints.

Batch execution of simulations is analogous to batch processing in manufacturing, and the monitoring and visualization techniques described above may also be applied to monitor the behavior of sequences of simulations. Specifically, they can be used to monitor the progress of individual simulations, detect simulation runs which deviate from an 'in-control' region defined by a normative ensemble of simulations, and provide geometrical representations of various likely simulation end points under various conditions. The illustrative embodiment of the present invention may be implemented to perform batch simulation monitoring within a simulation block language such as Simulink implemented in the form of a simulation block or other form, and also within a batch simulation tool such as the Simulation and Test Workshop. Those skilled in the art will recognize that other simulation environments are also possible within the scope of the present invention.

The illustrative embodiment of the present invention may also be used to analyze a continuous rather than a batch process. The analysis determines an indicator of process condition based on the current state of the process defining a single point in n dimensional score space representing the current process condition. The user establishes ranges of possible values for certain process set points that would result from one or more user-initiated control moves. The set of scores defined by the current process condition, and all possible user-defined values of the said process set points, describe a region of scores representing process conditions achievable by adjusting the process set points within the specified ranges. A display of the region of potential process conditions and a control region of acceptable variability in three dimensions is generated for a user. The user is able to manipulate various features of the display in order to assess whether any of the set points in the user defined range(s) would cause the process condition to deviate from the control region, and so simulate the potential outcome of making those control adjustments. These graphical manipulations may include varying the viewpoint of the control region and condition trajectory, adjusting the opacity of the control region, zooming in on certain subsets, rotating the entire view, changing the origin and intensity of the simulated lighting of the view, manipulating contract and colors, visually 'cutting open' the control region in order to visualize the relationship between the process condition, its trajectory and the interior of the control region.

Since certain changes may be made without departing from the scope of the present invention, it is intended that all matter contained in the above description or shown in the accompanying drawings be interpreted as illustrative and not in a literal sense. Practitioners of the art will realize that the system configurations depicted and described herein are examples of multiple possible system configurations that fall within the scope of the current invention. For example, the present invention may be practiced in other block diagram execution environments such as text based simulation environments. Likewise, the sequence of steps utilized in the illustrative flowcharts are examples and not the exclusive sequence of steps possible within the scope of the present invention.

We claim:

1. A computer-implemented method of visualizing a process condition, the method comprising:
  collecting data from a process;
  determining an indicator of the process condition based in part upon the collected data and predicted future data for the process;
  generating a graphical representation in three or more dimensions of the indicator of the process condition and a control region; and
  generating an interactive data panner for the indicator of the process condition, where the generating further includes:
    projecting the indicator of the process condition onto three dimensions and interactively varying geometry of the projection.

* * * * *